(12) United States Patent
Canari et al.

(10) Patent No.: US 7,780,932 B2
(45) Date of Patent: Aug. 24, 2010

(54) FLUE GAS DESULFURIZATION PROCESS

(75) Inventors: Riki Canari, Judean Hills (IL); Aharon Eyal, Jerusalem (IL)

(73) Assignees: Clue AS, Bergen (NO); Eyal Research Consultants Ltd., Jerusalem (IL)

( * ) Notice: Subject to any disclaimer, the term of this patent is extended or adjusted under 35 U.S.C. 154(b) by 0 days.

(21) Appl. No.: 12/439,746

(22) PCT Filed: Sep. 4, 2007

(86) PCT No.: PCT/IL2007/001091

§ 371 (c)(1),
(2), (4) Date: Mar. 3, 2009

(87) PCT Pub. No.: WO2008/029398

PCT Pub. Date: Mar. 13, 2008

(65) Prior Publication Data

US 2009/0257932 A1 Oct. 15, 2009

(30) Foreign Application Priority Data

Sep. 5, 2006 (IL) .................................... 177901
Sep. 2, 2007 (IL) .................................... 185651

(51) Int. Cl.
*B01D 53/50* (2006.01)
*B01D 53/56* (2006.01)
*B01D 53/62* (2006.01)
*B01D 53/64* (2006.01)

(52) U.S. Cl. .................. 423/210; 423/212; 423/243.01; 423/243.08; 423/243.09; 423/243.06; 423/215.5; 423/235; 423/220; 423/222; 423/225

(58) Field of Classification Search ................. 423/210, 423/212, 243.01, 243.08, 243.09, 243.06, 423/215.5, 235, 220, 222, 225
See application file for complete search history.

(56) References Cited

U.S. PATENT DOCUMENTS

| 3,535,083 | A | * | 10/1970 | Smith | ....................... 423/567.1 |
| 5,024,684 | A | | 6/1991 | Tank | |
| 2005/0084434 | A1 | * | 4/2005 | Cox et al. | .................... 423/235 |
| 2005/0244318 | A1 | * | 11/2005 | Caro et al. | .................... 423/212 |

FOREIGN PATENT DOCUMENTS

| EP | 0342559 A | 11/1989 |
| EP | 1023932 A | 8/2000 |
| WO | 9013360 A1 | 11/1990 |
| WO | 9843727 A1 | 10/1998 |

* cited by examiner

*Primary Examiner*—Timothy C Vanoy
(74) *Attorney, Agent, or Firm*—Lucas & Mercanti, LLP

(57) ABSTRACT

A process for desulfurizing an $SO_2$-comprising gaseous stream comprising the steps of: a. providing an aqueous feed comprising an anion selected from a group consisting of carbonate, bicarbonate, hydroxide, sulfite, and hydrogen sulfite; b. providing an $SO_2$-comprising gaseous feed; and c. contacting the aqueous feed and the gaseous feed to generate a desulfurized gaseous product comprising less than 40% of the feed $SO_2$ content, and an aqueous product; wherein the contacting is carried out in a cyclone unit comprising a housing defined by a cylindrical peripheral wall and provided with at least one inlet opening for receiving fluids thereinto and with at least one swirling means, and wherein the cyclone unit is characterized in that the velocity of the gaseous stream inside the cyclone unit is between 20 m/sec and 120 m/sec.

35 Claims, 3 Drawing Sheets

FIGURE 3

Table 1

| Experiment | Example | Gas flow Nm³/h | T gas in °C | T gas out °C | Engine capacity % | Solution composition | Liquid/Gas ratio L/Nm³ | SO₂ conc. In ppm | SO₂ absorption % (w/w) |
|---|---|---|---|---|---|---|---|---|---|
| 112 | 1 | 4632 | 303 | 64 | 75 | brackish water | 0.75 | 596 | 17.3 |
| 113 | 2 | 4632 | 304 | 57 | 75 | brackish water | 1.5 | 594 | 25.3 |
| 114 | 3 | 4632 | 302 | 47 | 75 | brackish water | 2.34 | 596 | 41.1 |
| 115 | 4 | 3323 | 310 | 52 | 50 | brackish water | 3 | 576 | 45.6 |
| 118 | 5 | 2034 | 298 | 73 | 25 | brackish water | 3 | 547 | 42.2 |
| 119 | 6 | 1392 | 236 | 70 | 10 | brackish water | 3 | 412 | 43.3 |
| 120 | 7 | 4632 | 303 | 49 | 75 | brackish water | 2.31 | 642 | 38.1 |
| 121 | 8 | 4632 | 301 | 43 | 75 | brackish water | 3 | 627 | 49.6 |
| 122 | 9 | 4632 | 301 | 39 | 75 | brackish water | 4 | 585 | 74 |
| 123 | 10 | 5671 | 331 | 44 | 100 | brackish water | 3 | 678 | 81.8 |
| 124 | 19 | 4632 | 304 | 48 | 75 | brackish water + 180ppm NaCO₃ | 2.31 | 601 | 63 |
| 125 | 11 | 4632 | 301 | 51 | 75 | ~5% Na₂SO₃ | 2.3 | 579 | 95.8 |
| 127 | 12 | 4632 | 298 | 64 | 75 | ~5% Na₂SO₃ | 0.75 | 584 | 90.3 |
| 128 | 13 | 4632 | 299 | 59 | 75 | ~5% Na₂SO₃ | 1.5 | 605 | 44.3 |
| 129 | 14 | 5671 | | | 100 | ~5% Na₂SO₃ | 2 | 725 | 99.6 |
| 130 | 15 | 3323 | | | 50 | ~5% Na₂SO₃ | 2 | 604 | 89 |
| 131 | 16 | 1392 | | | 10 | ~5% Na₂SO₃ | 2 | 437 | 59.9 |
| 132 | 17 | 2034 | | | 25 | ~5% Na₂SO₃ | 2 | 576 | 70.7 |
| 133 | 18 | 4632 | | | 75 | ~5% Na₂SO₃ | 2 | 629 | 95.4 |
| 134 | 20 | 4632 | 306 | 49 | 75 | concentrated brackish water | 2.3 | 605 | 64 |
| 135 | 21 | 4632 | 301 | 51 | 75 | ~5% Ca(OH)₂ | 1 | 630 | 65 |

FLUE GAS DESULFURIZATION PROCESS

The present invention relates to a flue gas desulfurization (FGD) process in which sulfur dioxide is removed from flue gases.

More specifically, the present invention relates to a process for the removal of sulfur dioxide from flue gases by means of an advanced separation unit.

Fossil fuel combustion is used in industrial processes for many different purposes. Unfortunately, fossil fuel combustion produces several contaminants, which have been found to be detrimental to the environment. In particular, sulphur and nitrogen oxide compounds are the major components of "acid rain". Sulphur is a naturally occurring element in crude oil, concentrated in the residual components of the crude oil distillation process. The amount of sulphur in the fuel oil depends mainly on the source of crude oil, and to a lesser extent on the refining process. Typically for fuel on a world wide basis, the value is in the order of 1.5-4%. These values lead to high concentration of $SO_2$ in flue gases. For example, when using a fuel containing 1.5% S, the concentration of $SO_2$ in the emitted gas is about 630 ppm, and with a fuel containing 4% S, the concentration of $SO_2$ in the emitted gas is about 1700 ppm.

In recognition of the harm caused by sulfur oxides (SOx) and nitrogen oxides (NOx) compounds, different combustion gas cleaning processes and separation technologies have been developed to remove these components of combustion flue gases prior to release of the flue gases into the atmosphere, especially since the burning of fossil fuel releases many millions of tons of $SO_2$ every year.

Ships are fast becoming the biggest source of air pollution in the EU. Unless more action is taken, they are set to emit more than all land sources combined by 2020.

European waters will be the first in the world to introduce more stringent sulphur emission regulations for ships, with the coming into force of so-called Sulphur Emission Control Areas (SECAs) in the Baltic Sea in 2006, followed by the North Sea and English Channel in 2007.

Under the European Union (EU) Marine Sulphur Directive, only low-sulphur fuels of less than 1.5% S will be permitted. Furthermore a 1.5% sulphur cap in fuel will apply to fuels used by passenger vessels operating regular services to and from any community port from Aug. 11, 2006, and not just in SECAs.

The EU legislation allows using technologies that abate the sulphur content in the emitted gas as an alternative to using low-sulphur fuels (of 1.5% S). Thus, the technology should assure reductions in sulphur emissions that are at least equal to, or better, than those achieved by lowering the sulphur content in bunker fuel.

Most of the FGD technologies use wet scrubbing processes in which the emitted flue gases are contacted with an aqueous solution. The aim of these processes is to provide high absorption efficiencies, i.e., above 70-95% $SO_2$ absorption. The demands relating to an absorption process are high and the conditions are with a limited degree of freedom. For example, the efficiency of the reaction between the components in the aqueous solution and the SOx in the gas phase e.g. in the flue gas being treated decreases as the temperature of reaction increases, especially above about 70° C. However, the temperature of the emitted gas is about 300° C. thereby diminishing the efficiency of the process.

In addition, the volume of the emitted gas is huge, reaching an output of about 12000 m³/hr for a relatively small engine with a capacity of about 1 MW. Thus a high efficiency process is required in order to avoid the dependence on large equipment to process said large volume of gas. Equipment size is particularly critical on board of ships where the available space is limited.

Another desire is using low amounts of aqueous solution, as the solution has to be pumped, contacted with the flue gas and then treated after use. Processes that absorb $SO_x$ by contacting the flue gas with an aqueous solution require large and expansive equipment, and therefore are extremely disadvantageous as they require large deck areas to accommodate this equipment.

Two parameters determine the absorption efficiency: the composition of the aqueous solution and the efficiency of the contact between the gas phase and the droplets of the absorbing solution. FGD technologies should provide excellent contact between these two components and efficient chemical absorption in order to conform to these strict parameter requirements.

Currently there is a need for a very efficient FGD technology particularly in situations of high temperatures and large volumes of the emitted gas, and for the provision of an FGD technology requiring only small volumes of aqueous solution and utilizing smaller-sized equipment. Thus there is a need for an FGD technology that is characterized by very efficient contact, small equipment size, simplicity and high cost effectiveness as compared to other systems that are presently in use and other suggested technologies.

The main objective of the present invention is to provide a cost effective method for the absorption of $SO_2$ emitted from flue gases of engines, industrial boilers and incinerators, such as engines in ships, electric utility boilers, boilers and incinerators, from process plants such as smelters, acid plants, refineries, and pulp and paper mills using very efficient equipment, as compared to the prior art.

With this state of the art in mind, there is now provided, according to the present invention, a process for desulfurizing an $SO_2$-comprising gaseous stream comprising the steps of:
A. providing an aqueous feed comprising an anion selected from a group consisting of carbonate, bicarbonate, hydroxide, sulfite, and hydrogen sulfite;
B. providing an $SO_2$-comprising gaseous feed; and
C. contacting said aqueous feed and said gaseous feed to generate a desulfurized gaseous product comprising less than 40% of the feed $SO_2$ content, and an aqueous product;

wherein said contacting is carried out in a cyclone unit comprising a housing defined by a cylindrical peripheral wall and provided with at least one inlet opening for receiving fluids thereinto and with at least one swirling means, and wherein said cyclone unit is characterized in that the velocity of said gaseous stream inside said cyclone unit is between 10 m/sec and 120 m/sec.

Preferably the velocity of said gaseous stream inside said cyclone unit is between 60-100 m/sec.

In especially preferred embodiments the velocity of said gaseous stream inside said cyclone unit is between 60-70 m/sec.

In preferred embodiments of the present invention the volume ratio between the flow of said aqueous feed and that of said gaseous feed is between 0.5/1 and 3/1 liter per Nm³, wherein Nm³ is the volume of the gaseous stream in Normal Conditions which Normal Conditions are defined as: temperature=20.0° C., (68° F.) and Pn=1.01 bara, (14.72 psia).

In especially preferred embodiments of the present invention the volume ratio between the flow of said aqueous feed and that of said gaseous feed is between 1/1 to 2/1 liter/Nm³.

The process of the present invention is especially adapted for use in high capacity engines and thus preferably said gaseous feed comprises flue gas from a combustion engine with capacity of at least 0.5 MW.

In preferred embodiments of the present invention said $SO_2$-comprising gaseous stream is an emission of flue gas from a source selected from the group consisting of engines, industrial boilers and incinerators, such as engines in ships, electric utility boilers, boilers and incinerators from process plants such as smelters, acid plants, refineries, and pulp and paper mills.

As will be realized, the process of the present invention can be used in many contexts and locations as stated above, however in preferred embodiments of the present invention said process is carried out in a location selected from the group consisting of ships, seashores, ports, and regions where at least one of seawater and brackish water is available.

In the most preferred embodiment, said process is conducted on a ship.

In other preferred embodiments of the present invention said process is carried out when said engine is operating at, at least, 5 percent of its maximal capacity.

Preferably said aqueous feed comprises a component selected from the group consisting of sea water, brackish water and combinations thereof.

While on ships sailing in open see the generation of a disulfurized gaseous product comprising less than 40% of the feed $SO_2$ content is sufficient, as indicated, in other preferred embodiments of the present invention, the process can be carried out on land such as at seashore locations, ports, lending ships, and other regions where at least one of sea water and/or brackish water is available, and in such locations the process of the present invention in its preferred embodiments enables the generation of a desulfurized gaseous product comprising less than 10% of the feed $SO_2$ content, and an aqueous product.

In especially preferred embodiments of this aspect of the present invention, there is generated a desulfurized gaseous product comprising less than 3% of the feed $SO_2$ content, and an aqueous product.

In preferred embodiments of the present invention said aqueous feed comprises a cation selected from the group consisting of Ca, Na, ammonium and combinations thereof.

Preferably, said $SO_2$ concentration in said gaseous feed is in the range between 150 and 2000 ppm.

In preferred embodiments of the present invention said process further comprises the steps of providing oxygen and contacting it with said gaseous feed, said aqueous feed, or any combination thereof.

In especially preferred embodiments of the present invention said contacting is conducted in said cyclone unit.

Preferably in this aspect of the invention, said process further comprises the step of providing an oxidation catalyst.

In preferred embodiments of the present invention said process further comprises catalyst which selected from the group consisting of an NOx oxidation catalyst, an NOx reduction catalyst, and a combination thereof.

In preferred embodiments of the present invention said catalyst is injected as particles into said gaseous stream. In still another preferred embodiment of the present invention said catalyst is permanently located at the entrance to or inside the cyclone unit.

In preferred embodiments of the present invention UV means are added before or into the cyclone unit for stimulating NOx oxidation or reduction.

In still another preferred embodiment of the present invention said gaseous stream is heated before entering it into said cyclone unit, in order to stimulate NOx selective-non-catalytic-reduction (SNCR).

In some preferred embodiments of the present invention said aqueous feed comprises a component selected from a group consisting of solid specific absorbents, non-specific absorbents, surfactants, chelating agent, and complexant.

In preferred embodiments of the present invention said process comprises the step of adding at least one alkaline compound to said aqueous feed, to said aqueous product or to both.

Preferably, said alkaline compound is selected from the group consisting of lime, limestone, CaO, NaOH, $NaHCO_3$, $Na_2SO_3$, or any combination thereof.

In especially preferred embodiments of the present invention said at least one alkaline compound is a calcium compound.

In especially preferred embodiments of the present invention said calcium compound is selected from the group consisting of lime, limestone and CaO. Preferably, said addition results in a precipitation containing Ca compounds which is partially separated from the system.

In preferred embodiments of the present invention said alkaline component that is added to said aqueous feed is a sodium component.

In other preferred embodiments of the present invention, wherein said alkaline component is a sodium component, a swap stage is added to the process after step C. In said swap stage a stream that contains $Ca(OH)_2$ or/and CaO is mixed with said wash solution which also contains a bisulfite ion to form calcium sulfite/calcium sulfate that is separated from the mixture solution as well as forming a treated wash solution that contains sodium and sulfite ions. A typical reaction in said swap stage is described according to reaction (1):

$$NaHSO_3 + Ca(OH)_2 \rightarrow CaSO_3 + Na_2SO_3 \qquad (1)$$

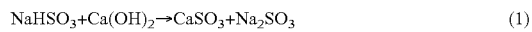

When adding said swap stage, at least a portion of said treated wash solution is recycled back to the cyclone unit in order that $Na_2SO_3$ molecules will absorb another quantity of $SO_2$ molecules. The calcium sulfite stream that is separated in this stage can be accumulated or discharged, preferably discharged into the sea. By recycling the solution, lower amounts of aqueous solution have to be pumped, contacted with the flue gas and then treated after use.

In especially preferred embodiments of the present invention said alkaline component that is added to said aqueous stream is a mixture of sodium and calcium components. The Na alkaline component is responsible for a fast neutralization reaction in said cyclone unit with the $H_2SO_3$ or $H_2SO_4$ that is formed by the reaction between water and $SO_2$ and $SO_3$ molecules. The Ca alkaline component is responsible for the formation of precipitate containing $CaSO_3$ or $CaSO_4$ which is separated from the system. In this way the contact time for the reaction (1) is extended.

In preferred embodiments of the present invention $CaSO_3$ or $CaSO_4$ precipitation is separated from the system.

In preferred embodiments of the present invention said alkaline component is introduced into said aqueous stream in a form selected from the group consisting of particles, a solution, a suspension or a combination thereof.

In preferred embodiments of the present invention the concentration of said alkaline component in said aqueous stream is between 100 ppm-30% w/w, preferably between 200 ppm-6%.

In other preferred embodiments of the present invention CaO is added to said aqueous stream. When contacted with water molecules, CaO forms $Ca(OH)_2$. The method of adding CaO to the aqueous stream and allowing the reaction to occur on its own, as opposed to adding $Ca(OH)_2$ itself, is preferred as the resultant $Ca(OH)_2$ concentration in the solution is in fact higher. This occurs due to the fact that when added to the aqueous stream the dissolved CaO forms $Ca(OH)_2$, which, after super saturation conditions, precipitates. However, when adding $Ca(OH)_2$ to the aqueous stream, the $Ca(OH)_2$ is dissolved and then takes a long time to reach maximum solubility. Thus, when adding CaO, to the aqueous stream, the actual $Ca(OH)_2$ concentration is higher compared to that of when adding of $Ca(OH)_2$ to the aqueous stream.

Preferably the pH of said aqueous feed is less than about 9.5.

In preferred embodiments of the present invention said aqueous stream is chilled before entering it into said cyclone unit.

In preferred embodiments of the present invention ice is added to said cyclone unit in order to reduce the temperature of the streams.

In the process of the present invention, preferably said contacting is characterized by a reduction of the temperature of the gaseous feed by between about 100 and 350° C.

In some preferred embodiments of the present invention said provided aqueous feed comprises recycled, optionally treated, aqueous product.

In this aspect of the present invention said aqueous product is preferably treated with a basic compound prior to recycling or simultaneously therewith, in order to generate at least one of sulfate and sulfite salts therein.

In a variation of this aspect of the present invention a precipitate is generated and at least partially separated from said optionally treated aqueous product prior to recycling or simultaneously therewith.

Preferably said precipitate contains Ca cation.

In especially preferred embodiments of the present invention at least a portion of said aqueous product is discharged, e.g., into the ocean, when the process is carried out on a ship.

In other preferred embodiments of the present invention said provided gaseous feed comprises, optionally treated, gaseous product.

It will be realized that the process of the present invention can be carried out in a manner wherein said contacting is conducted in multiple cyclone units arranged in parallel to each other, in a sequence or a combination thereof.

In other preferred embodiments of the present invention the process further comprises the steps of providing oxygen and contacting it with said aqueous product.

The efficacy of the process of the present invention is also evidenced by the fact that in preferred embodiments of the present invention said gaseous feed also comprises at least one contaminant selected from a group consisting of particles in the size of 1-2 micrometers, larger particles, smaller particles, sulfur oxides other than $SO_2$, nitrogen oxides, $CO_2$, oil, odor molecules, and toxic metals and upon application of the process thereto, the content of at least one of said contaminants in said desulfurized gaseous product is smaller than that of the gaseous feed by at least 40%.

In preferred embodiments of the present invention the separation efficiency for particles in the size of 1-2 micrometers presented in said gaseous stream is between 50-97%.

In preferred embodiments of the present invention, when carried out on a ship or adjacent a body of water the process further preferably comprises the step of adjusting the aqueous product for discharge into the sea.

Preferably said adjusting comprises controlling at least one of the parameters selected from a group consisting of pH, temperature and reducing the content of at least one of sulfites, sulfates and contaminants selected from a group consisting of oil, odor molecules, toxic metals, particles, soot, sulfur oxides other than $SO_2$, nitrogen oxides, $CO_2$.

The absorption efficiency of $SO_2$ or $SO_3$ from said $SO_2$-comprising gaseous stream is dependent on several parameters. From the thermodynamic point of view, the efficiency is mainly dependent on the temperature of the streams, the concentration of the alkaline component, the pH of said aqueous stream, the volume-ratio between the flow of said aqueous and said gaseous streams, on the $SO_2$ and $SO_3$ concentration in said $SO_2$-comprising gaseous stream, and on said gaseous stream flow. However, since the contact time is so short the parameters affecting the kinetics of the process are extremely important in determining the absorption efficiency. From the kinetic point of view the efficiency is mainly dependent on the droplet size of the aqueous-stream, the mixing efficiency, the flow of said two streams, the amount of hindering compounds on the surface of the aqueous droplets (like oil) that hinders the contact between the molecules of the $SO_2$ and those of the water or alkaline compounds etc.

As a result, it is difficult to reach high absorption efficiencies. For example absorption efficiencies of above 97% are very uncommon in the literature; however, by using the present method absorption rates of above 99.3% $SO_2$ were achieved.

In addition, the $SO_2$ separation results show an increase in the absorption efficiency as the volume flow-ratio between the aqueous stream and the gaseous stream (L/G) increases.

The present method shows surprisingly, more unexpected results. The $SO_2$ separation results show an increase in the absorption efficiency as the engine capacity increases, Table 1 (examples 4,5,6,8,10 and examples 14-18).

In addition, in preferred embodiments of the present invention, said contact is characterized the cyclone unit to reduce the temperature of the gaseous stream by between 100-350° C., as can be learned from Table 1, which shows cases in which the temperature was reduced by more than 280° C. (see example 10).

In preferred embodiments of the present invention at least part of said aqueous stream, after contact in said cyclone unit, is recycled in the system and injected back into said cyclone unit to be used at least twice.

In preferred embodiments of the present invention said wash solution is discharged after one contact in said cyclone unit.

In preferred embodiments of the present invention at least a portion of said desulfurized gaseous product is recycled back to the cyclone unit.

In preferred embodiments of the present invention said wash solution is contacted with an amount of oxygen-containing gas.

In preferred embodiments of the present invention said method comprises the further step of separating undesired components selected from the group consisting of soot, oil, poisons metals and combination thereof from said wash solution.

In preferred embodiments of the present invention said method comprises the further steps for controlling parameters which characterize said wash solution, so that said wash solution will have parameters acceptable for its discharge into the sea.

In preferred embodiments of the present invention said parameters are selected from the group consisting of pH, content of unstable sulfites, temperature, soot content, content of poisons, metals, and oil content.

In preferred embodiments of the present invention said $SO_2$ concentration in said gaseous stream, before entering said cyclone unit, is in the range of 150-2000 ppm. However, said gaseous stream also comprises at least one contaminant selected from a group consisting of particles, sulfur oxides other than $SO_2$, nitrogen oxides and $CO_2$, oil, odor molecules, toxic metals and wherein the concentration of at least one of said contaminants in said desulfurized gaseous product is smaller than that in the gaseous stream by at least 40%.

In preferred embodiments of the present invention said aqueous stream comprises a component selected from a group consisting of solid specific absorbents and non specific absorbents in order to absorb very small particles presented in gas phase, and specific molecules that should be separated such as odor molecules.

In preferred embodiments of the present invention said aqueous stream comprises a component selected from the group consisting of surfactants, chelating agent and complexants, in order to absorb pollutants having a hydrophobic nature (such as oil or octane) and to absorb undesired metals.

Surprisingly, in situations in which said aqueous stream contains about 5% $Na_2SO_3$ very small amounts of particles where observed on the surface of the resulting wash solution after contact. In contrast, large amounts of particles were observed on the surface of the wash solution in the case of using an aqueous stream containing only brackish water. These results can be explained as follows: the particles that enter the cyclone unit from the engine have an active surface. In the case of using 5% $Na_2SO_3$ the particles were surrounded by ions such as $Na^+$, $SO_3^=$, and thus, were dispersed in the aqueous solution and not floated above the aqueous solution as in the case of using brackish water.

EXAMPLES AND FIGURES

While the invention will now be described in connection with certain preferred embodiments in the following examples and figures so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

FIGURES

FIG. 3 is a graphical presentation of a table setting forth the results of experiments carried out according the examples herein.

Figure 1:
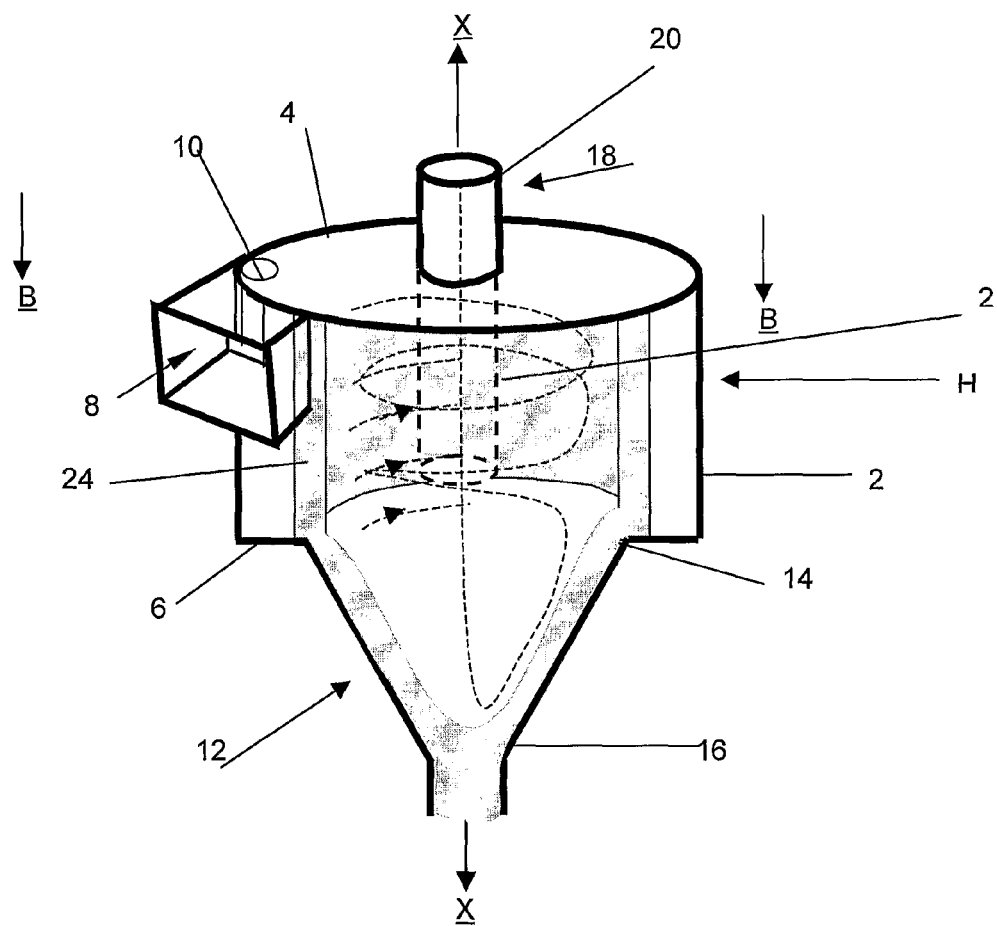
FIG. 1 is an example of a schematic presentation of the cyclone unit according to the present invention.
Figure 2:
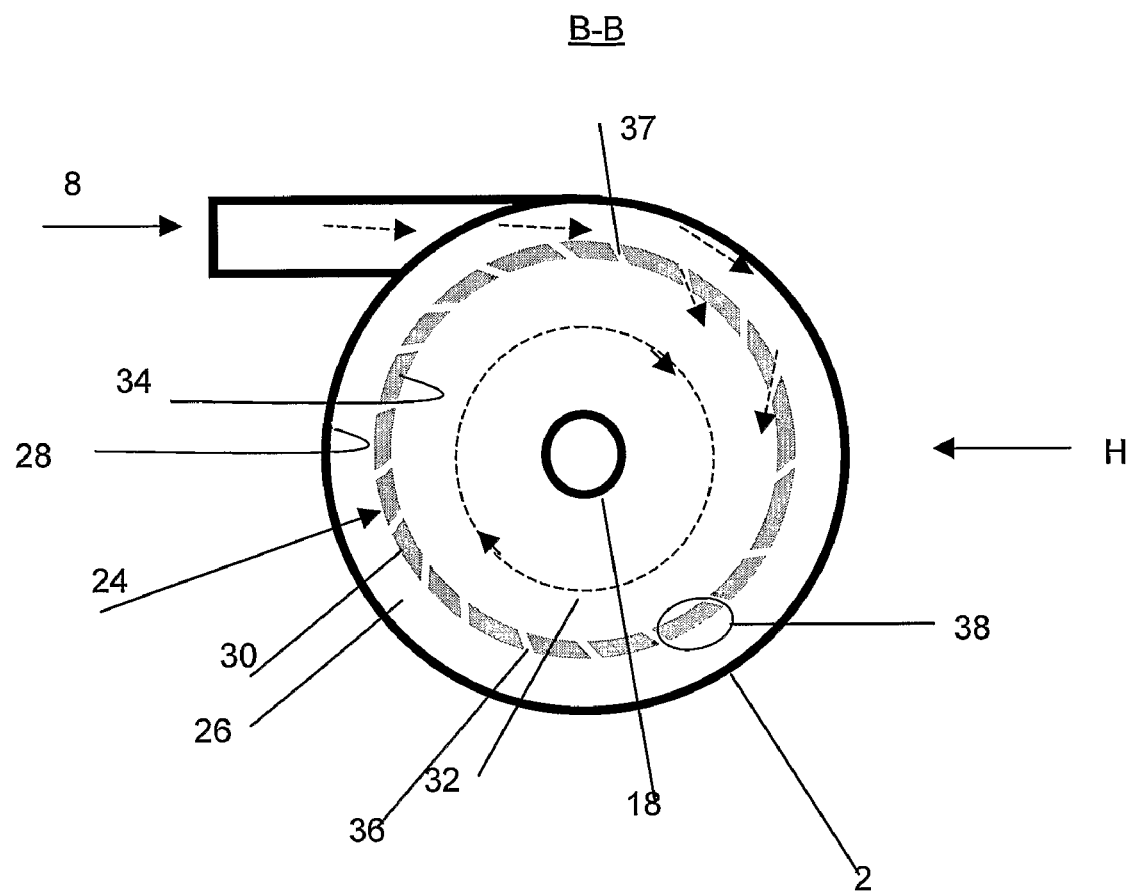
FIG. 2 is an example of a cross-sectional view of a housing taken along B-B.

Referring to FIGS. 1 and 2, there is seen a preferred cyclone unit for use according to the present invention comprising: a housing (H) defined by a cylindrical peripheral wall (2) thereof and by upper (4) and lower (6) extremities, said housing having a longitudinal axis (X-X) and being provided with at least one inlet opening (8) for receiving said gaseous stream and at least one inlet opening (10) for receiving said aqueous stream thereinto. Said cyclone unit further comprises an outlet means from said housing (H) preferably formed as a hollow truncated cone (12), having a large base (14) and a spaced apart small base (16), the large base thereof being in communication with the lower extremity (6) of said housing (H). A pipe means (18) is placed within said housing (H), preferably coaxially with the longitudinal axis (X-X) wherein an uppermost extremity (20) of the pipe means (18) is located outside of the housing, and a lowermost extremity (22) of said pipe means is located within the housing.

Said cyclone unit further comprises at least one swirling means (24) being formed as a cylindrical ring and being mounted within said housing, coaxially with the longitudinal axis (X-X) so as to provide an annular space (26) between the housing central wall (28) and the peripheral wall (30) of said swirling means and to provide an inner annular space (32) between the central wall (34) of the swirling means (24) and the lowermost extremity (22) of said pipe means (18).

Said swirling means (24) are defined by a plurality of openings (36) so as to enable passage from said annular space (26) towards said inner annular space (32). Said passages (37) are characterized by a specific shape.

Using the cyclone unit described above, said gaseous stream enters through at least one of said inlet openings (8) to said annular space (26) and then passes through at least one of said plurality of openings (36) and then at least one passages (37) towards said inner annular space (32), while said aqueous stream enters through at least one of said inlet openings (10) into said housing and is contacted with said gaseous stream. These two mixed streams are then caused to flow through said hollow truncated cone (12) whereas said gaseous product is exiting though said pipe means (18), while said wash solution is collected through said small base (16) of said hollow truncated cone (12) into said appropriate collecting receptacle.

The passage of said gaseous stream through said plurality of openings (36), and then passages (37) results in an unexpectedly high velocity of said gaseous stream, said velocity being between 20 m/sec-120 m/sec, and in preferred embodiments being between 60-70 m/sec. As a result a very efficient contact between said gaseous and aqueous streams is achieved. This is compared to a typical cyclone scrubber that is characterized by the ability to produce a velocity of about 15-50 m/sec.

In especially preferred embodiments of the present invention said cyclone unit is of the type described in EP 0971787B1, comprising a housing (H) defined by cylindrical peripheral wall (2) thereof and by upper (4) and lower (6) extremities, said housing having a longitudinal axis (X-X) and being provided with at least one inlet (8) opening for receiving streams thereinto, said inlet opening being formed within said peripheral wall (2) and being directed preferably tangentially with respect thereto; an outlet means from said housing (H) being formed preferably as a hollow truncated cone (12), having a large base (14) and a spaced apart small base (16), the large base thereof being in communication with the lower extremity of said housing (6) and said small base thereof being in communication with an appropriate collecting receptacle, a pipe means (18) being placed within said housing, preferably coaxially with the longitudinal axis (X-X), an uppermost extremity (20) of the pipe means being located outside of the housing and a lowermost extremity (22) of said pipe means being located within the housing; at least one swirling means (24) for imparting vertical motion to said fluid, said swirling means being formed as a tubular member, defined by a peripheral annular wall (38) with an opposite upper and lower end, said swirling means being mounted within said housing coaxially with the longitudinal axis of said housing so as to provide for an annular space (26) therebetween, said swirling means being provided with a plurality of slit-like elongated openings (36), formed in the peripheral wall (38) thereof so as to enable passage of fluid therethrough, characterized in that said pipe means extends along the swirling means and slit-like openings are arranged regularly on the peripheral wall (38) of the swirling means so as to extend substantially tangentially with respect to the interior thereof, wherein said slit-like openings (36) are defined by a length and width dimension, and wherein the length dimension exceeds the width dimension.

It is important to note that it was not self evident that the cyclone units described in EP 0971787B1 and above for removal of particulate matter from flue gases would be effective for the removal of gaseous contaminants especially sulfur dioxide from flue gases. In the case of particle removal in a cyclone unit the main objective or challenge is to achieve good separation between the gas phase and the particles by means of physical dynamics. In other words, the objective taught and achieved in said patent was to maximize the difference between the motions of the gas and those of the particles inside the cyclone unit and thereby to achieve separation between these two elements. In contradistinction, in the case of removal of gaseous contaminants, especially sulfur dioxide from flue gases, the main objective is to achieve an effective mixing between the liquid and the gaseous phases, and thereby to achieve an efficient contact between an active element, such as an alkaline compound in the aqueous phase and the sulfur dioxide in the gaseous phase, in order to have higher kinetics.

For example although Bag-Filter® is an effective device for separating a particulate solid from flue gases and is effective even for the removal of particles with a particle size between 0.1 and 0.01 micron, it is definitely not effective for the removal of gaseous contaminants, such as sulfur dioxide. Therefore, It was far from obvious that the cyclone unit described in EP 0971787B1 could be successfully and advantageously used to efficiently remove sulfur dioxide from flue gases.

Examples 1-21

In 21 separate experiments, flue gas that was produced by using a 1 MW MAN engine was contacted with aqueous solution by using an improved cyclone unit of a volume of 10000 m³. Table 1 presents the conditions in each experiment: the flow of the flue gas, the temperature of the flue-gas stream entering and exiting the cyclone unit, the engine capacity, the composition of the aqueous solution, the $SO_2$ concentration in the flue gas stream entering the unit and the Liquid to Gas volume-ratio (L/G ratio). Table 1 presents in addition the $SO_2$ absorption efficiency (% w/w).

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for desulfurizing an $SO_2$-comprising gaseous stream comprising the steps of:
    a. providing an aqueous feed comprising an anion selected from a group consisting of carbonate, bicarbonate, hydroxide, sulfite, and hydrogen sulfite;
    b. providing an $SO_2$-comprising gaseous feed; and
    c. contacting said aqueous feed and said gaseous feed to generate a desulfurized gaseous product comprising less than 40% of the feed $SO_2$ content, and an aqueous product;
    wherein said contacting is carried out in a cyclone unit comprising a housing defined by a cylindrical peripheral wall and provided with at least one inlet opening for receiving fluids thereinto and with at least one swirling means, and wherein the velocity of said gaseous stream inside said cyclone unit is between 60 m/sec and 100 m/sec.

2. A process according to claim 1 wherein the volume ratio between the flow of said aqueous feed and that of said gaseous feed is between 0.5/1 and 3/1 liter per Nm³.

3. A process according to claim 1 wherein the volume ratio between the flow of said aqueous feed and that of said gaseous feed is between 1/1 to 2.5/1 liter/Nm³.

4. A process according to claim 1 wherein said gaseous feed comprises flue gas from a combustion engine with capacity of at least 0.5 MW.

5. A process according to claim 4 wherein said engine operates on a ship.

6. A process according to claim 4, wherein said engine is operating at, at least, 5 percent of its maximal capacity.

7. A process according to claim 1 whenever said cyclone unit is situated in a location selected from the group consisting of ships, seashores, ports, and regions where at least one of seawater and brackish water is available.

8. A process according to claim 1 wherein said aqueous feed comprises a component selected from the group consisting of sea water, brackish water and combinations thereof.

9. A process according to claim 1 wherein there is generated a desulfurized gaseous product comprising less than 5% of the feed $SO_2$ content, and an aqueous product.

10. A process according to claim 1 wherein there is generated a desulfurized gaseous product comprising less than 3% of the feed $SO_2$ content, and an aqueous product.

11. A process according to claim 1 wherein said aqueous feed comprises a cation selected from the group consisting of Ca, Na, ammonium and combinations thereof.

12. A process according to claim 1 wherein said $SO_2$ concentration in said gaseous feed is in the range between 150 and 2000 ppm.

13. A process according to claim 1 further comprising the steps of providing oxygen and contacting it with said gaseous feed, said aqueous feed, or any combination thereof.

14. A process according to claim 13 further comprising the step of providing an oxidation catalyst.

15. A process according to claim 13 wherein said contacting is conducted in said cyclone unit.

16. A process according to claim 1 wherein said aqueous feed comprises a component selected from a group consisting of solid specific absorbents, non-specific absorbents, surfactants, chelating agent, and complexant.

17. A process according to claim 1 further comprising the step of adding at least one alkaline compound to said aqueous feed, to said aqueous product or to both.

18. A process according to claim 17 wherein said alkaline compound is selected from the group consisting of lime, limestone, CaO, NaOH, $NaHCO_3$, $Na_2SO_3$, or any combination thereof.

19. A process according to claim 17 wherein said at least one alkaline compound is a calcium compound.

20. A process according to claim 17 wherein said alkaline compound is added in a form selected from the group consisting of particles, solution, suspension and a combination thereof.

21. A process according to claim 1 wherein the pH of said aqueous feed is less than about 9.5.

22. A process according to claim 1 wherein said contacting is characterized by a reduction of the temperature of the gaseous feed by between about 100 and 350° C.

23. A process according to claim 1 wherein said provided aqueous feed comprises recycled, optionally treated, aqueous product.

24. A process according to claim 23 wherein said aqueous product is treated with a basic compound to generate at least one of sulfate and sulfite salts therein.

25. A process according to claim 23 wherein a precipitate is generated and at least partially separated from said optionally treated aqueous product.

26. A process according to claim 25 wherein said precipitate contains Ca cation.

27. A process according to claim 1 wherein at least a portion of said aqueous product is discharged.

28. A process according to claim 1 wherein said provided gaseous feed comprises, optionally treated, gaseous product.

29. A process according to claim 1 wherein said contacting is conducted in multiple cyclone units.

30. A process according to claim 1 further comprising the steps of providing oxygen and contacting it with said aqueous product.

31. A process according to claim 1 wherein said gaseous feed also comprises at least one contaminant selected from a group consisting of particles in the size of 1-2 micrometers, larger particles, smaller particles, sulfur oxides other than $SO_2$, nitrogen oxides, $CO_2$, oil, odor molecules, and toxic metals and wherein the content of at least one of said contaminants in said desulfurized gaseous product is smaller than that in the gaseous feed by at least 40%.

32. A process according to claim 1 comprising the further step of adjusting the aqueous product for discharge into the sea.

33. A process according to claim 32 wherein said adjusting comprises controlling at least one of the parameters selected from a group consisting of pH, temperature and reducing the content of at least one of sulfites, sulfates and contaminants selected from a group consisting of oil, odor molecules, toxic metals, particles, soot, sulfur oxides other than $SO_2$, nitrogen oxides, $CO_2$.

34. A process according to claim 1 wherein at least a portion of said desulfurized gaseous product is recycled back to the cyclone unit.

35. A process for desulfurizing an $SO_2$-comprising gaseous stream comprising the steps of:
   a. providing an aqueous feed comprising an anion selected from a group consisting of carbonate, bicarbonate, hydroxide, sulfite, and hydrogen sulfite;
   b. providing an $SO_2$-comprising gaseous feed; and
   c. contacting said aqueous feed and said gaseous feed to generate a desulfurized gaseous product comprising less than 40% of the feed $SO_2$ content, and an aqueous product;

wherein said contacting is carried out in a cyclone unit comprising a housing having a longitudinal axis (X-X), said housing being defined by a cylindrical peripheral wall and provided with a first inlet for said aqueous feed and a second inlet for said gaseous feed and with at least one swirling means, said swirling means being formed as a cylindrical ring and being mounted within said housing coaxially with said longitudinal axis so as to provide a first annular space between said peripheral wall and said cylindrical ring and to provide a second annular inner space bounded by said cylindrical ring, to define a cyclone vortex chamber, said swirling means being defined by a plurality of openings and passages provided in and through said cylindrical ring and being positioned to enable said gaseous feed to flow from said first annular space through a plurality of said plurality of openings and passages to said second inner annular chamber, and wherein said cyclone unit is characterized in that the velocity of said gaseous stream inside said cyclone vortex chamber is between 20 m/sec and 120 m/sec.

* * * * *